US012335533B2

(12) United States Patent
Mohananchettiar et al.

(10) Patent No.: US 12,335,533 B2
(45) Date of Patent: Jun. 17, 2025

(54) MULTI-DISTRIBUTION ENTROPY MODELING OF LATENT FEATURES IN IMAGE AND VIDEO CODING USING NEURAL NETWORKS

(71) Applicant: Dolby Laboratories Licensing Corporation, San Francisco, CA (US)

(72) Inventors: Arunkumar Mohananchettiar, Bengaluru (IN); Jay Nitin Shingala, Bangalore (IN); Peng Yin, Ithaca, NY (US); Sean Thomas McCarthy, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 52 days.

(21) Appl. No.: 18/548,137

(22) PCT Filed: Mar. 24, 2022

(86) PCT No.: PCT/US2022/021730
§ 371 (c)(1),
(2) Date: Aug. 28, 2023

(87) PCT Pub. No.: WO2022/204392
PCT Pub. Date: Sep. 29, 2022

(65) Prior Publication Data
US 2024/0163485 A1    May 16, 2024

Related U.S. Application Data

(60) Provisional application No. 63/211,793, filed on Jun. 17, 2021.

(30) Foreign Application Priority Data

Mar. 26, 2021  (IN) .............................. 202141013582
Jun. 17, 2021  (EP) ...................................... 21180014

(51) Int. Cl.
H04N 19/70       (2014.01)
H04N 19/136      (2014.01)
(Continued)

(52) U.S. Cl.
CPC .......... H04N 19/70 (2014.11); H04N 19/136 (2014.11); H04N 19/42 (2014.11); H04N 19/91 (2014.11)

(58) Field of Classification Search
CPC .......... G06N 3/047; G06N 3/08; G06N 3/045; H04N 19/136; H04N 19/70; H04N 11/00; H04N 17/004; H04N 19/91; H04N 19/42
See application file for complete search history.

(56) References Cited

U.S. PATENT DOCUMENTS 9,781,449 B2   10/2017  Korman
10,262,428 B2   4/2019  Rosman
(Continued)

FOREIGN PATENT DOCUMENTS

EP    3544005 A1    9/2019
JP   2017103722 A    6/2017
(Continued)

OTHER PUBLICATIONS

Balle, J., et al., Variational Image Compression with a Scale Hyperprior, International Conference on Learning Representations (ICLR), 2018.
(Continued)

*Primary Examiner* — Neil R Mikeska

(57) ABSTRACT

Methods, systems, and bitstream syntax are described for the entropy modeling of latent features in image and video coding using a combination of probability density functions. Using high-level syntax elements, an encoder may signal to compliant decoders the multi-distribution entropy model using: the number of one or more PDFs being used, an
(Continued)

identifier of each PDF being used among a list of available PDFs, the number of PDF parameters in each PDF, and syntax elements indicating which PDF parameters across two or more PDFs being used are being shared.

14 Claims, 5 Drawing Sheets

(51) Int. Cl.
  *H04N 19/42* (2014.01)
  *H04N 19/91* (2014.01)

(56) References Cited

U.S. PATENT DOCUMENTS

| | | | |
|---|---|---|---|
| 2020/0027247 A1* | 1/2020 | Minnen | G06F 17/18 |
| 2020/0090049 A1 | 3/2020 | Aliper | |
| 2020/0090069 A1 | 3/2020 | Mandt | |
| 2020/0107023 A1 | 4/2020 | Lee | |
| 2020/0275130 A1* | 8/2020 | Bokov | H04N 19/13 |
| 2020/0327701 A1 | 10/2020 | Zhou | |
| 2020/0364603 A1 | 11/2020 | Oktay | |
| 2020/0374522 A1 | 11/2020 | Zhou | |
| 2021/0067808 A1 | 3/2021 | Schroers | |
| 2023/0262267 A1* | 8/2023 | Said | H04N 19/463 382/232 |
| 2024/0104786 A1* | 3/2024 | Johnston | G06F 17/18 |
| 2024/0121392 A1* | 4/2024 | Said | H04N 19/94 |

FOREIGN PATENT DOCUMENTS

| | | |
|---|---|---|
| JP | 2020191077 A | 11/2020 |
| WO | 2020068498 A1 | 4/2020 |

OTHER PUBLICATIONS

Cheng, Z., et al., Learned Image Compression With Discretized Gaussian Mixture Likelihoods and Attention Modules, 2020 IEEE/CVF Conference on Computer Vision and Pattern Recognition (CVPR), Jun. 13, 2020, pp. 7936-7945. X9033805084.

Duda, J., Asymmetric numeral systems: Entropy coding combining speed of Huffman coding with compression rate of arithmetic coding, aRXiv preprint arXiv: 1311.2540V2, Jan. 6, 2014.

Ladune, T., et al., Binary Probability Model for Learning Based Image Compression, ICASSP 2020, IEEE International Conference on Acoustics, Speech and Signal Processing (ICASSP), May 4, 2020, pp. 2168-2172. XP033793693.

Lu, G., et al., DVC: An End-to-end Deep Video Compression Framework, IEE/CVF Conference on Vision and Pattern Recognition (CVPR), IEE Computer Society, pp. 10998-11007, 2019.

Minnen, D., et al., Image-Dependent Local Entropy Models for Learned Image Compression, 2018 25th IEEE International Conference on Image Processing (ICIP), Oct. 7, 2018, pp. 430-434. XP033455072.

Minnen, D., et al., Joint Autoregressive and Hierarchical Priors for Learned Image Compression, 32nd Conference on Neural Information Processing Systems (NeurIPS 2018), Montreal, Canada.

Wang, Q., et al., An Information Geometry-Based Distance Between High-Dimensional Covariances for Scalable Classification, IEEE Transactions on Circuits and Systems for Video Technology, vol. 28, No. 10, Oct. 2018.

* cited by examiner

MULTI-DISTRIBUTION ENTROPY MODELING OF LATENT FEATURES IN IMAGE AND VIDEO CODING USING NEURAL NETWORKS

CROSS-REFERENCE TO RELATED APPLICATIONS

This application is a U.S. National Stage application under U.S.C. 371 of International Application No. PCT/US2022/021730, filed on Mar. 24, 2022, which claims the benefit of priority to U.S. Provisional Patent Application No. 63/211,793, filed Jun. 17, 2021, European Patent Application No. 21180014.9, filed Jun. 17, 2021, and Indian Provisional Patent Application No. 202141013582, filed Mar. 26, 2021, each of which is hereby incorporated by reference in its entirety.

TECHNOLOGY

The present document relates generally to images. More particularly, an embodiment of the present invention relates to multi-distribution entropy modeling of latent features in image and video coding using neural networks.

BACKGROUND

In 2020, the MPEG group in the International Standardization Organization (ISO), jointly with the International Telecommunications Union (ITU), released the first version of the Versatile Video coding Standard (VVC), also known as H.266. More recently, the same group has been working on the development of the next generation coding standard that provides improved coding performance over existing video coding technologies. As part of this investigation, coding techniques based on artificial intelligence and deep learning are also examined. As used herein the term "deep learning" refers to neural networks having at least three layers, and preferably more than three layers.

As appreciated by the inventors here, improved techniques for the coding of images and video based on neural networks are described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Example embodiments that relate to a multi-distribution entropy modeling of latent features in image and video coding using neural networks are described herein. In the following description, for the purposes of explanation, numerous specific details are set forth in order to provide a thorough understanding of the various embodiments of present invention. It will be apparent, however, that the various embodiments of the present invention may be practiced without these specific details. In other instances, well-known structures and devices are not described in exhaustive detail, in order to avoid unnecessarily occluding, obscuring, or obfuscating embodiments of the present invention.

SUMMARY

Example embodiments described herein relate to image and video coding using neural networks. In an embodiment, a processor receives a coded image or a coded video sequence for coded pictures, and syntax parameters for an entropy model for latent features of the coded image or coded video sequence, wherein the entropy model comprises one or more probability density functions (PDFs) selected from a list of available PDFs that includes different distribution types. The processor parses the syntax parameters for the entropy model for the latent features to generate model parameters for the entropy model, wherein the syntax parameters comprise: the number of one or more PDFs being used, an identifier of each PDF being used among the list of available PDFs, and optionally the number of PDF parameters in each PDF, and further optionally syntax elements indicating which PDF parameters across two or more PDFs being used are being shared. The processor uses a neural network to decode the coded image or the coded video sequence using the generated model parameters for the entropy model. In an example, the entropy model comprises a weighted average of two or more PDFs.

In another embodiment, a processor receives an image or a video sequence comprising pictures, analyzes the image or the video sequence using a neural network to determine an entropy model for the latent features, wherein the entropy model comprises a one or more probability density functions (PDFs) selected from a list of available PDFs that includes different distribution types. The processor generates syntax parameters for the entropy model, wherein the syntax parameters comprise: the number of PDFs being used, an identifier of each PDF being used among the list of available PDFs, and optionally the number of PDF parameters in each PDF, and further optionally which PDF parameters across two or more PDFs being used are being shared. The processor encodes the image or the video sequence into a coded bitstream using the determined entropy model for the latent features, and includes the syntax parameters for the entropy model in the coded bitstream. In an example, the entropy model comprises a weighted average of two PDFs.

Example End-to-End Video Coding Model

Figure 1:
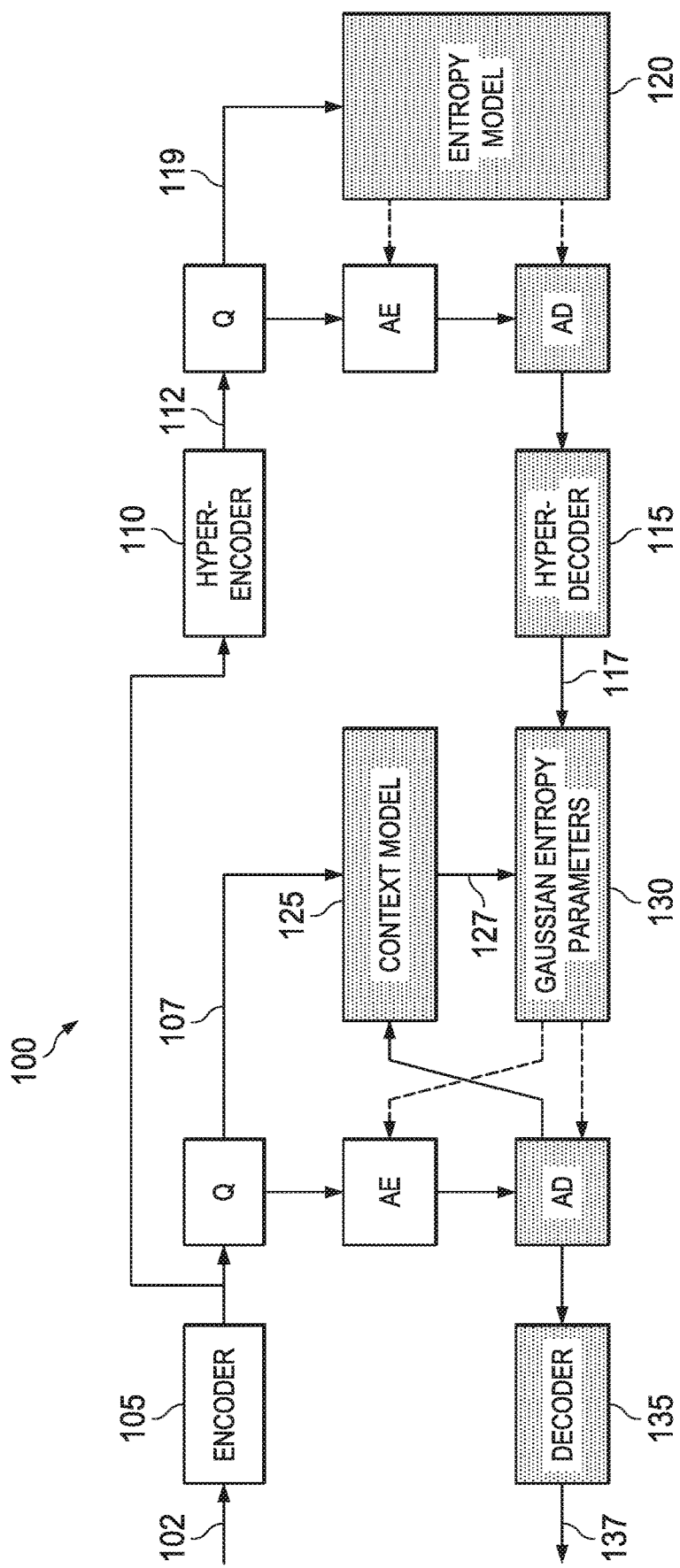
FIG. 1 depicts an example neural-networks model for image and video coding based on the probabilistic modeling of latent features according to prior art.

FIG. 1 depicts an example process (100) for modeling image and video coding based on neural learning and the coding of latent features (Refs. [1-4]). As used herein, the terms "latent features" or "latent variables" denote features or variables that are not directly observable but are rather inferred from other observable features or variables, e.g. by processing the directly observable variables. In image and video coding, the term 'latent space' may refer to a representation of the compressed data in which similar data points are closer together. In video coding, examples of latent features include the representation of the transform coefficients, the residuals, the motion representation, syntax elements, model information, and the like. In the context of neural networks, latent spaces are useful for learning data features and for finding simpler representations of the image data for analysis.

As depicted in FIG. 1, given input images 102, there are two main sub-networks: an autoencoder, which learns a quantized latent representation of the images (Encoder 105 and Decoder 135 blocks), and a sub-network which is responsible for learning a probabilistic model over quantized latents ($\hat{y}$) (107) used for entropy coding. The subnetwork combines the Context Model (125), an autoregressive model over latents, with the hyper-network (Hyper Encoder and Hyper Decoder blocks 110 and 115), which learns to represent information useful for correcting the context-based predictions. The data from these two sources is combined by an entropy modeling network (130), which generates parameters (e.g., the mean and variance) for a conditional Gaussian entropy model.

In FIG. 1, the arithmetic encoding (AE) blocks yield the compressed representation of the latent symbols ($\hat{y}$) (107) coming from the quantizer (Q), which is stored in a file. Therefore, at decoding time, any information that depends on the quantized latents may be used by the decoder once it has been decoded. In order for the context model 125 to work, it can only access previously decoded latents.

This model jointly optimizes an autoregressive component that predicts latents (y) from their causal context (Context Model 125) along with a hyperprior and the underlying autoencoder. Real-valued latent representations are quantized (Q) to create quantized integer-valued latents ($\hat{y}$) (107) and quantized hyperlatents ($\hat{z}$) (119), which are compressed into a bitstream using an arithmetic encoder (AE) and are decompressed by an arithmetic decoder (AD). Blocks with a cross-hatch background correspond to the components that are executed by the receiver to reconstruct an image (137) from a compressed bitstream.

As discussed in Refs. [1-2], a hierarchical prior (or hyperprior) z (112) is used to improve the entropy model of the latents by capturing their spatial dependencies. Such a model allows for end-to-end training, which includes joint optimization of a quantized representation of the hyperprior, the conditional entropy model, and the base autoencoder. Under this model, the compressed hyperpriors may be added to the generated bitstream as side information, which allows the decoder to use the conditional entropy model. In this way, a separate entropy model (120) of the hyperpriors allows for a richer and more accurate model.

The training goal is to minimize the expected length of the bitstream as well as the expected distortion of the reconstructed image with respect to the original, giving rise to a rate-distortion (R/D) optimization problem:

$$R+\lambda D, \quad (1)$$

where $\lambda$ is the Lagrange multiplier that determines the desired rate-distortion (RD) trade-off, and R and D may be expressed as:

$$R=E_{x \sim p_x}[-\log_2 p_{\hat{y}} q(f(x))],$$

$$D=E_{x \sim p_x}[d(x,g(q(f(x))))], \quad (2)$$

where $p_x$ denotes an unknown distribution of natural images, $q(\cdot)$ represents rounding to the nearest integer, $y=f(x)$ denotes an encoder output, $\hat{y}=q(y)$ represents the quantized latents, $p_{\hat{y}}$ is a discrete entropy model and $\hat{x}=g(\hat{y})$ is the decoder output where $\hat{x}$ represents the reconstructed image. The rate term corresponds to the cross entropy between the marginal distribution of the latents and the learned entropy model, which is minimized when the two distributions are identical. The distortion term may correspond to a closed-form likelihood, such as when $d(x, \hat{x})$ represents a measure of distortions, such as the Mean Squared Error (MSE), a Structural Similarity Image Measure (SSIM), Multiscale Structural Similarity (MS-SSIM), IW-SSIM (Information Content Weighted Structural Similarity Measure), FSIM (Feature Similarity Index Measure), PSNR-HVSM (Peak Signal to Noise Ratio Human Visual System Measure, taking into account a Contrast Sensitivity Function (CSF) and between-coefficient contrast masking of DCT basis functions), VMAF(Video Multi-method Assessment Fusion), VIF (Visual Information Fidelity measure), VDP2 (Visual Difference Predictor), NLPD (Normalized Laplacian Pyramid Distortion), and a learning-based distortion measure such as LPIPS (Learned Perceptual Image Patch Similarity), DISTS (Deep Image Structure and Texture Similarity), and the like. As in Ref. [1], because both the compressed latents and the compressed hyper-latents are part of the generated bitstream, the rate-distortion loss from equation (1) may be expanded to include the cost of transmitting $\hat{z}$. Coupled with the distortion metric D, the full loss function becomes:

$$R+\lambda D+R_z, \quad (3)$$

where $$R_z=E_{x \sim p_x}[-\log_2 p_{\hat{z}}(\hat{z})] \quad (4)$$

denotes the rate due to the hyper-latents.

This kind of end to end deep learning compression-based framework using neural networks in general consists of two parts: the core autoencoder and an entropy sub-network. The core autoencoder is used to learn a quantized latent vector of the input image or video signal. For this aspect, the key is to how to define an efficient neural-nets (NN) architecture. The entropy sub-network is responsible for learning a probabilistic model over the quantized latent representations, utilized for entropy coding. For this aspect, finding the right entropy model is very critical to reduce the bitrate overhead. Embodiments of the invention herein propose a new entropy modeling of latent features.

In Ref. [1], the latent features $\hat{y}$ are modeled by a Gaussian distribution $N(\mu, \sigma^2)$ with mean $\mu$ and standard deviation $\sigma$. The mean and the standard deviation (which may also be referred to as a scale parameter) are estimated jointly using the auto-regressive context model parameters $\Phi$ (127) from previously reconstructed latents $\hat{y}_{<i}$ and learned hyperprior features parameters Ψ (117) derived from the hyperprior latents ẑ coded in the bitstream as side information. The distribution of ŷ$_i$ latents is considered independently—conditioned on the hyperpriors and the context model.

Figure 5A:
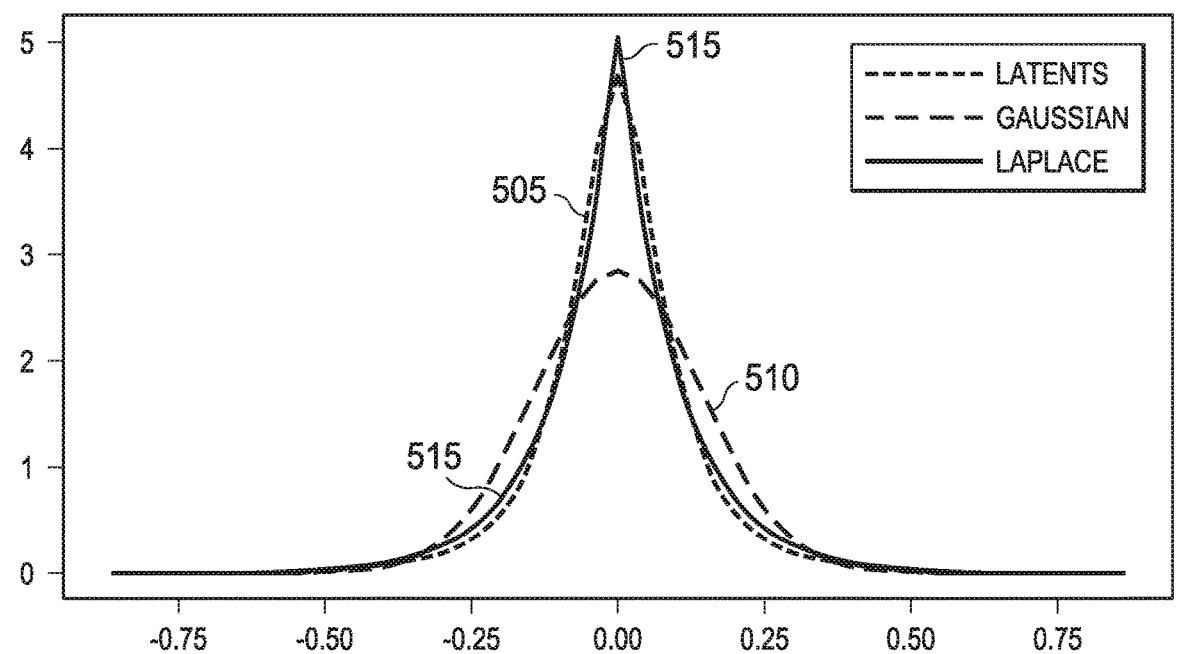
FIG. 5A and FIG. 5B depict histograms of a low-variance y-latent group (FIG. 5A) and a high-variance y-latent group (FIG. 5B) compared with Laplace and Gaussian probability density functions of the same variance.
Figure 5B:
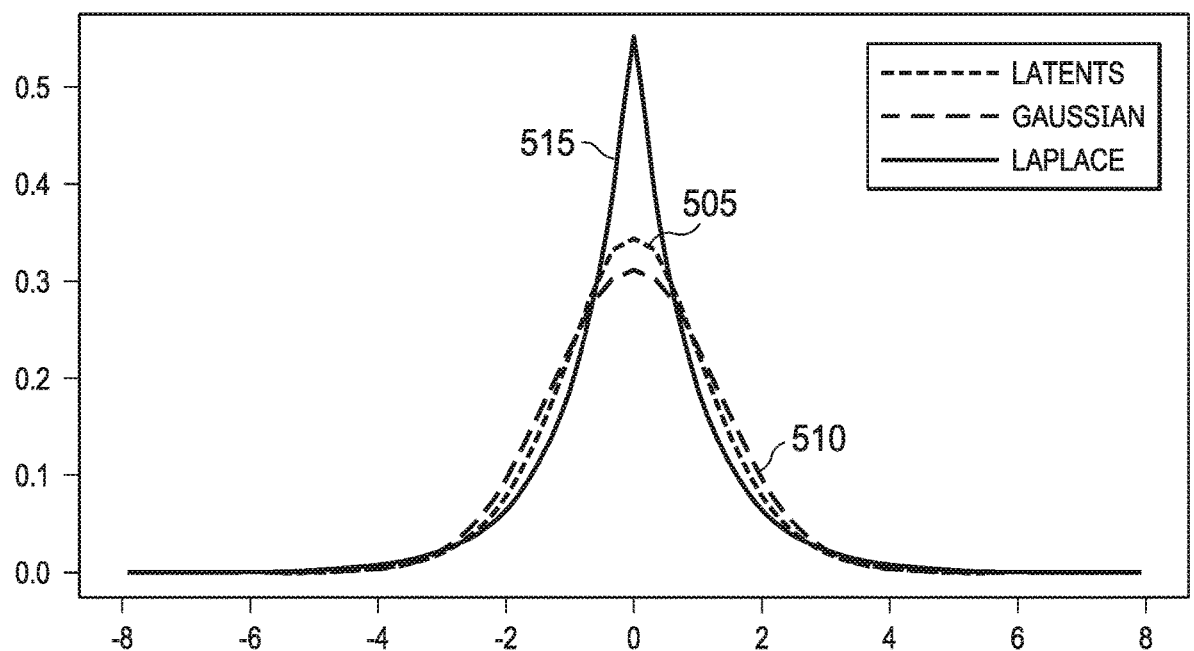

In the literature (Refs. [1-4]), typically, either a single Gaussian model or a Gaussian Mixture Model (GMM) are used in neural networks for image/video based codecs. In either case, the entropy model is based on Gaussian distribution, described as $N(\mu_g, \sigma_g^2)$. However, experimental data indicate that latent variables do not always follow a Gaussian distribution. Such an example is shown in FIG. 5 which depicts histograms of a low-variance y-latent group (505) (FIG. 5A) and a high-variance y-latent group (505) (FIG. 5B) compared to Laplace (515) and Gaussian (510) probability density functions of the same variance (scale).

Thus, it may be more appropriate to model the distribution of latent features using alternative probability density functions (PDFs), such as Laplace, exponential, exponential power, Chi-squared, a gamma, or other type of distributions known in the art.

As another example, screen-captured content has statistical characteristics distinct from camera-captured and natural imagery. Thus, coding efficiency can be improved if a more accurate entropy distribution model is used based on the source of image data.

In an embodiment, a mixture of multiple entropy distribution models is proposed to improve the coding efficiency for image and video coding. For example, in one embodiment, it is proposed to replace block 130 of (100) depicted in FIG. 1, which uses a Gaussian model, with block 230 in FIG. 2, which uses a model representing a mix of Laplace and Gaussian probability density functions (LGM) based entropy modeling of the latent features, where the Gaussian model may be described as $N(\mu_g, \sigma_g^2)$·) and the Laplace model may be described as $L(\mu_l, \sigma_l^2)$. The same idea can be applied to other mixture models using a combination of two or more distinct probability density functions (e.g., Gaussian and uniform, Laplace and uniform, and the like).

Figure 4:
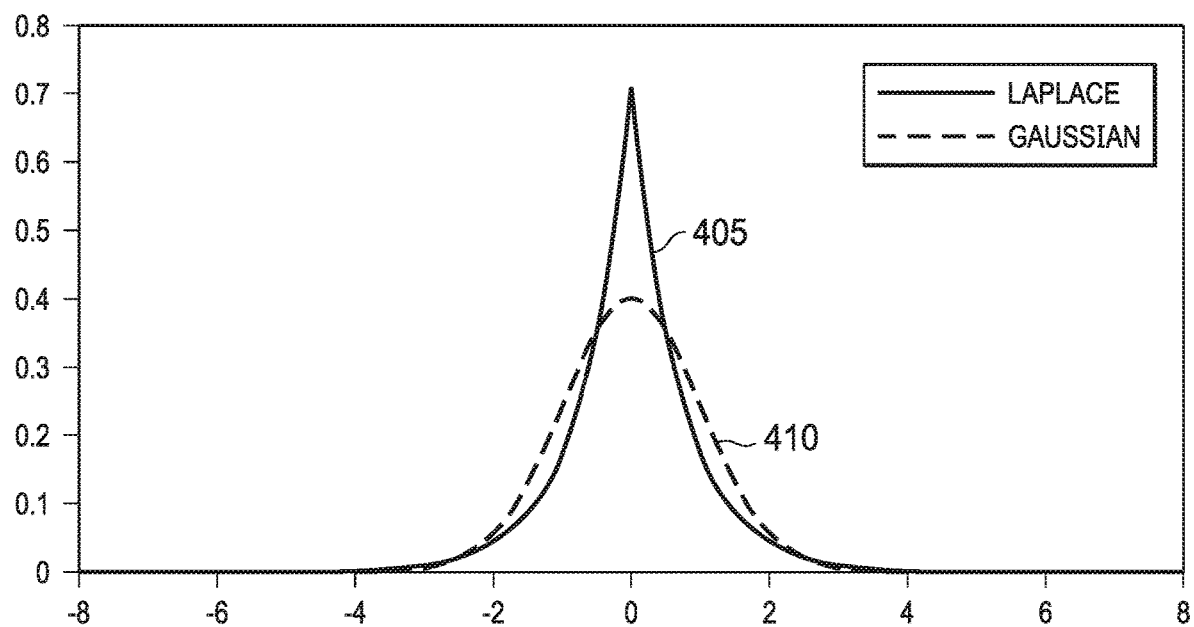
FIG. 4 depicts example Laplace and a Gaussian probability density functions.

As seen in FIG. 4, the Laplace distribution (405) is significantly peakier than the Gaussian distribution (410) and has broader (wider) tails. From an analysis of the y-latent histograms, as shown in FIG. 5, it was observed that the low-variance latents (see 505 in FIG. 5A) followed a much peakier distribution than the Gaussian (510) and it is more suitable to be represented by a Laplace distribution (515), whereas the high-variance latents (see 505 in FIG. 5B) were closer to the Gaussian (510). Since one does not know a priori the variance of the latents, a mixture model of Laplace and Gaussian should be a better fit. From our experiments, the proposed combination model produced a coding-rate gain of 1.2% in the case of natural images and a gain of about 5% in the case of computer-generated images (screen-content).

Figure 2:
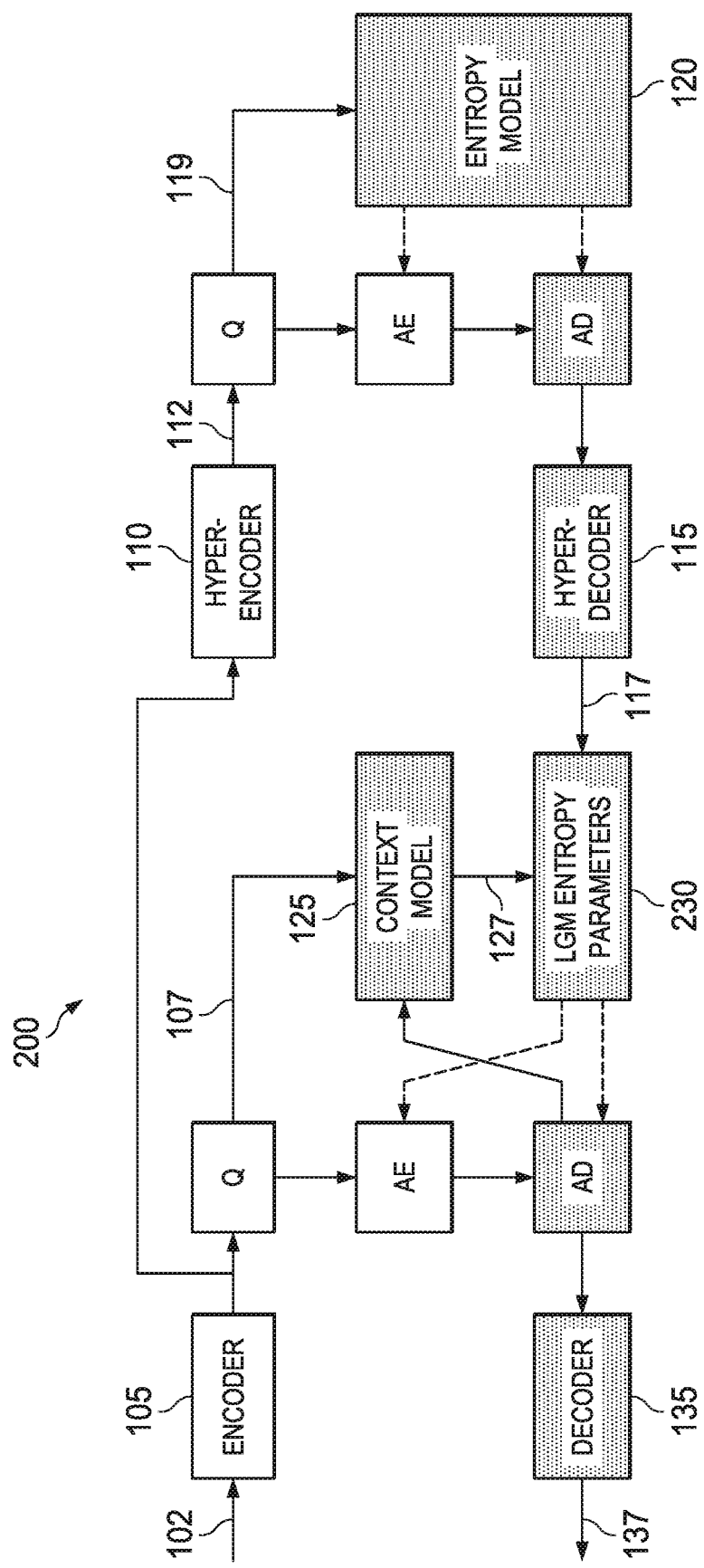
FIG. 2 depicts an example neural-networks model for image and video coding based on the probabilistic modeling of latent features according to an embodiment of this invention.

From an implementation point of view, under the proposed LGM model, the entropy parameters block 130 in system 100 is replaced with block 230 with parameters for the Laplace-Gaussian mixture model 200 as shown in FIG. 2. The proposed model can be adapted to a range of autoencoder based frameworks including hyperprior and joint autoregressive hyperprior models. The input features need to be adjusted accordingly in the training of the entropy parameters network, $g_{ep}$ (230). For example, the joint autoregressive hyperprior framework in FIG. 1 can be converted to the proposed model by replacing the Gaussian entropy parameters block (130) with the multi-distribution entropy block (230) shown in FIG. 2. The output Φ (127) of the context model (125) and the output Ψ (117) of the hyper-decoder (115) may be concatenated and fed to a multi-layer convolutional neural network to estimate the entropy parameters.

Figure 3:
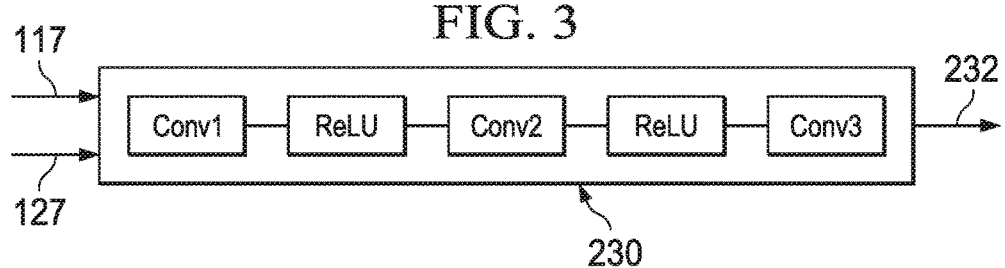
FIG. 3 depicts an example neural-networks network for generating parameters of a multi-distribution probability density function according to an embodiment of this invention.

FIG. 3 depicts an example neural network for estimating the parameters of a multi-distribution probabilistic model (e.g., the parameters of the LGM model, $\mu_g$, $\sigma_g^2$, $w_g$, $\mu_l$, $\sigma_l^2$, and $w_l$, where $w_g$ denotes weights associated with the Gaussian distribution and $w_l$ denotes weights associated with the Laplace distribution, so that the combined model for the i-th y-latent can be expressed as $$LGM(\mu_{gi}, \sigma_{gi}^2, w_{gi}, \mu_{li}, \sigma_{li}^2, w_{li}) = w_{gi} \cdot N(\mu_{gi}, \sigma_{gi}^2) + w_{li} \cdot L(\mu_{li}, \sigma_{li}^2), \quad (5)$$

where $N(\mu_{gi}, \sigma_{gi}^2)$ denotes a Gaussian distribution with mean $\mu_{gi}$ and variance $\sigma_{gi}^2$ and $L(\mu_{li}, \sigma_{gi}^2)$ denotes a Laplace distribution with mean $\mu_{li}$ and variance $\sigma_{li}^2$.

For example, consider the problem of modeling an end-to-end image or video encoder (200) using N (e.g., N=320) y-latent channels using a weighted average of unimodal distributions. In an embodiment, this is achieved by mixture of one Gaussian and one Laplace distribution sharing the mean. ($\mu = \mu_g = \mu_l$). Conv1, Conv2, and Conv3 are all 1×1 convolution layers whose channel specifications are (1280, 1066), (1066, 853), and (853, 1600) respectively, where the paired (a, b) numbers denote the number of input and output channels. In an embodiment, the LGM parameter network (230) outputs (232) five parameters per channel for $\mu$, $\sigma_g^2$, $\sigma_l^2$, $w_g$, and $w_l$. ReLU units denote rectified linear activation units. ReLU is a piecewise linear function that will output the input directly if it is positive, otherwise, it will output zero. It has become the default activation function for many types of neural networks because a model that uses it is easier to train and often achieves better performance.

Given the combined LGM model of equation (5), the parameters $\mu_{gi}$, $\sigma_{gi}^2$, $\mu_{li}$, $\sigma_{li}^2$ and the weights $w_{gi}$ and $w_{li}$ for the mixture model are computed by the entropy parameters network $g_{ep}$(230) using the context parameters, $\phi_i$ (127) produced by the autoregressive context model from the previously reconstructed latent features $\hat{y}_{<i}$ and the hyper-decoder parameters, $\psi_i$ (117) derived from the hyper-latents ẑ (119) coded in the bitstream.

The mixture component weights ($w_g$ and $w_l$) must be normalized using an additional layer (e.g. using the Softmax activation function) to ensure that they sum to unity.

Following the works of Refs [1-3], each latent $\hat{y}_i$ is modeled as a LGM convolved with a unit uniform distribution. This ensures a good match between the encoder and decoder distributions of both the quantized latents, and the continuous-valued latents added with uniform noise used during training.

The distribution of ŷ is modeled as $$p(\hat{y}|\hat{z}) = \prod_i \left( LGM(\mu_i^g, \sigma_i^{g2}, w_i^g, \mu_i^l, \sigma_i^{l2}, w_i^l) * U\left(-\frac{1}{2}, \frac{1}{2}\right) \right), \quad (6)$$

where $$U\left(-\frac{1}{2}, \frac{1}{2}\right)$$

denotes the uniform distribution.

The estimated probability $p(\hat{y}|\hat{z})$ is used by the entropy coder (AE) to encode the latent symbols into the bitstream.

The proposed scheme provides flexibility to model different kinds of unimodal and multimodal mixtures. In embodiments, a common mean parameter or different mean parameters can be used. Similarly, the standard deviations (or scales) can be chosen to be the same or different to suit the underlying characteristics of the dataset of interest. In another embodiment, the number of mixture components can be varied by modifying the number of layers in the output. The Laplace and Gaussian mixture entropy model thereby aids a learning-based image or video codec to improve the compression efficiency for a variety of contents.

Some embodiments may use a simpler model than the one depicted in FIG. 1 or 2, without the hyper-prior modeling (e.g., the coding-decoding loop between hyper-encoder 110 and hyper-decoder 115). In such a scenario, the entropy modeling (230) will be derived independently of the hyper-priors (117).

While embodiments described herein provide examples of multi-distribution entropy modeling in image and video coding, similar multi-distribution modeling may also be applied to coding audio and speech signals.

Example Entropy Model Syntax

The proposed framework can support a single probability distribution model or mixture of two or more probability distribution models. In one embodiment, the learning-based codec is trained to generate model parameters for multiple cases: one distribution model (either Laplace model, or Gaussian model), and/or mixture of multiple distributions (e.g., mixture of Laplace and Gaussian model). When encoding a picture, the encoder decides which distribution model to be used (for example, based on some Rate-Distortion decision, e.g., minimize R+λD, or some statistics of the picture), then codes model-related information in the high level syntax (HLS), such as a sequence header a picture header, and the like. The HLS will be carried together with the encoded bitstream. At the decoder, the decoder will read and parse the model-related information from the HLS. Then, the decoder can select the right model parameters to decode the bitstream and get a reconstructed picture. For example, when the entropy model uses two PDFs (say, Gaussian and Laplace), for each model, there is a corresponding hyper-latent neural network which assists in generating model parameters in block 230. For example, without limitation, an encoder may have three entropy sub-networks: N0, for Gaussian only, N1, for Laplace only, and N2, for LGM (a mix of Laplace and Gaussian). During decoding, depending on the HLS syntax, a decoder can decide which of these three entropy sub-networks to apply.

Table 1 shows such an example of HLS, where the codec supports LGM, either one of a Gaussian or Laplace model, or a weighted combination of the Laplace and Gaussian models.

TABLE 1

| Example syntax of LGM | |
| --- | --- |
| | Descriptor |
| entropy_model( ) { | |
|   num_of_gaussian_model | ue(v) |
|   num_of_laplace_model | ue(v) |
|   if ( (num_of_gaussian_model == 1) && | |
|   (num_of_laplace_model == 1) ) { | |
|     is_mean_value_shared | u(1) |
|     is_scale_value_shared | u(1) |
|   } | |
| } | | num_of_gaussian_model specifies the number of Gaussian models used to describe one latent variable. The value of num_of_gaussian_model shall be equal to or larger than 0.

num_of_laplace_model specifies the number of Laplace models used to describe one latent variable. The value of num_of_laplace_model shall be equal to or larger than 0. It is required that num_of_gaussian_model plus num_of_laplace_model should be larger than 0.

is_mean_value_shared equal to 1 specifies the same mean value is used for both the Gaussian models and Laplace models. is_mean_value_shared equal to 0 specifies that different mean values are used for the Gaussian model and Laplace model.

is_scale_value_shared equal to 1 specifies the same scale value is used for both Gaussian model and Laplace model. is_scale_value_shared equal to 0 specifies the different scale values are used for Gaussian model and Laplace model.

An example of syntax and semantics to support multiple distribution models is as follows:

TABLE 2

| Example syntax of multi-distribution entropy model | |
| --- | --- |
| | Descriptor |
| entropy_model( ) { | |
|   num_models | ue(v) |
|   if ( num_models > 0 ) { | |
|     for ( i = 1; i <= num_models; i++ ) { | |
|       model_id[ i ] | ue(v) |
|       if ( i > 1 ) { | |
|         num_model_params_minus1[ i ] | u(2) |
|         for ( j = 0; j <= num_model_params_minus1[ i ]; j++ ){ | |
|           share_model_params[ i ] [ j ] | u(1) |
|           if ( share_model_params[ i ] [ j ] ) { | |
|             shared_model_idx[ i ] [ j ] | ue(v) |
|           } | |
|         } | |
|       } | |
|     } | |
|   } | |
| } | |

In another embodiment, the information of Table 2 can also be described as depicted in Table 3, where model_id[i] starts at i=0 instead of at i=1. Furthermore, in Table 3, the value of num_model_params_minus1[i] is inferred from Table 4 and does not need to be explicitly transmitted.

TABLE 3

| Example syntax of multi-distribution entropy model | |
| --- | --- |
| | Descriptor |
| entropy_model( ) { | |
|   num_models | ue(v) |
|   if ( num_models > 0 ) { | |
|     for ( i = 0; i < num_models; i++ ) { | |

TABLE 3-continued

Example syntax of multi-distribution entropy model

| | Descriptor |
|---|---|
| model_id[ i ] | ue(v) |
| if ( i > 0 ) { | |
|   for ( j = 0; j <= num_model_params_minus1[ i ]; j++ ){ | |
|     share_model_params[ i ] [ j ] | u(1) |
|     if ( share_model_params[ i ] [ j ] ) | |
|       shared_model_idx[ i ] [ j ] | ue(v) |
|     } | |
|   } | |
| } | |
| } | | num_models specifies the maximum number of distribution models used to describe one latent variable. The value of num_models shall be greater than or equal to 0.

model_id[i] identifies the type of distribution model as specified in Table 4. The value of model_id[i] shall be in the range of 0 to 4. The values of 5, 6, and 7 for model_id are reserved for future use. When not present, the value of model_id[i] shall be inferred to be equal to 0.

num_model_params_minus1[i] plus 1 specifies the maximum number of model parameters for the i-th distribution model. When not present, the value of num_model_params_minus1 shall be inferred to be equal to the value specified in Table 4.

TABLE 4 model_id values

| | | | Model parameter indicated by shared_model_params[ i ] | | | |
|---|---|---|---|---|---|---|
| model_id | Distribution | num_model_params_minus1[ i ] | j = 0 | j = 1 | j = 2 | j = 3 |
| 0 | Gaussian | 1 | mean | Variance | | |
| 1 | Laplace | 1 | mean | Variance | | |
| 2 | Uniform | 1 | min | Max | | |
| 3 | Truncated normal | 3 | mean | Variance | min | max |
| 4 . . . 7 | Reserved | | | | | | shared_model_params[i][j] equal to 1 specifies that the j-th model parameter of the i-th distribution model is equal to the j-th model parameter of the distribution model indicated by shared_model_idx[i][j]. shared_model_params[i][j] equal to 0 indicates that the j-th model parameter of the i-th distribution model may not be equal to the j-th model parameter of any other distribution model. When not present, the value of shared_model_params[i][j] shall be inferred to be equal to 0.

shared_model_idx[i][j] specifies the index, k, of model_id [k] indicating that the value of the j-th model parameter of the i-th distribution model is equal to the value of the j-th model parameter of the k-th distribution model. The value of shared_model_idx[i][j] shall be less than i.

As an example, consider the case where one uses the syntax of Table 3 with a combination of two models: Gaussian and Laplace. Thus, num_models=2, and from Table 4, model_id[0]=0 and model_id[1]=1. Both have two parameters (mean and variance), thus num_model_params_minus1[i]=1, for i=0 and 1. Assuming the two models share their mean (the first parameter), but not their variance (the scale or standard deviation), then shared_model_params[1][0]=1// share mean in model 1
shared_model_params[1][1]=0
when shared_model_params[1][0]=1
  then shared_model_idx[1][ ]=0//share with model 0 (Gaussian)

Figure 6A:
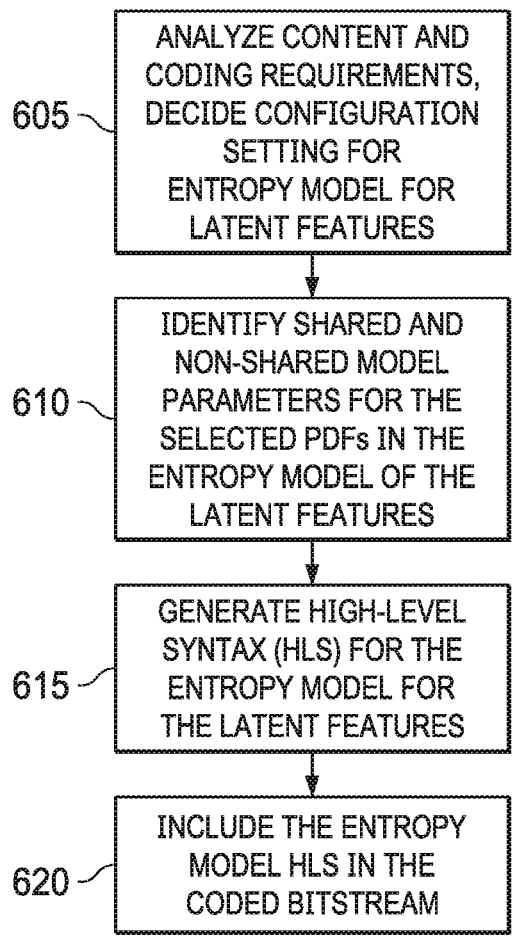
FIG. 6A depicts an example process for encoding a multi-distribution entropy model for latent features according to an embodiment of this invention.

FIG. 6A depicts an example processes for generating high-level syntax for the entropy model of the latent features according to an embodiment. As depicted in FIG. 6A, given an input image or a sequence of images, in step 605, the input content is analyzed and the encoder decides on the best entropy model for the latent features. For example, and without limitation, this decision may be based on statistical analysis of the images or latent features, coding requirements, or the source of the image content (e.g., natural images, animation, screen content, and the like). For example, as depicted in Table 3, without limitation, the encoder may decide to apply a combination of probability distributions functions (PDFs) among Gaussian, Laplace, uniform, and the like. Next, in step 610, the encoder needs to decide the extent to which the selected probability distributions share their model parameters, such as min, max, mean and scale (standard deviation). This information will also be used by the encoder to train a neural network (e.g., 230) to generate all the required entropy model parameters, including weights being used to combine the PDFs together. In step 615, the selected PDFs and information about the sharing of their model parameters is used to generate high-level syntax (e.g., as depicted in Tables 1-4). Such syntax can be updated at the sequence level, the picture level, or sub-picture levels, as needed to balance coding efficiency with coding complexity. For example, without limitation, an encoder may select to use a Laplace PDF for a first scene, a Gaussian PDF for a second scene, and a weighted average of Laplace and Gaussian PDFs for a third scene. In step 620, the generated high-level syntax for the entropy model of the latents is embedded into the bitstream.

Figure 6B:
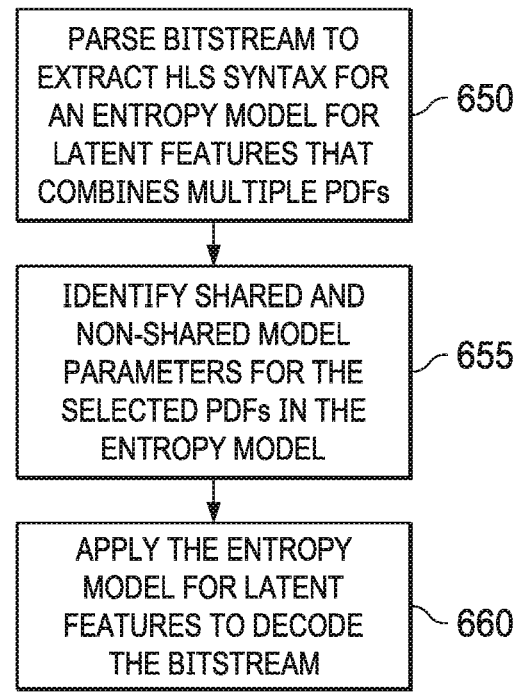
FIG. 6B depicts an example process for decoding a multi-distribution entropy model for latent features according to an embodiment of this invention.

FIG. 6B depicts an example processes for decoding high-level syntax for the entropy model of the latent features according to an embodiment. As depicted in FIG. 6B, a coded bitstream includes both coded data and high-level syntax related to the entropy model for the latent features. In step 650, the bitstream is parsed and information related to the entropy model for the latent features is identified. Given that information, in step 655, the decoder identifies the PDFs being used and the extend where the selected probability distributions share their model parameters, such as min, max, mean and scale (standard deviation). This information will also be used by the decoder to retrieve a deep neural network model (e.g., 230) which has all the required parameters, including the weights being used to combine the PDFs together. Finally, in step 660, the generated entropy model for the latent features is applied to decode the coded bitstream.

REFERENCES

Each one of the references listed herein is incorporated by reference in its entirety.
[1] D. Minnen, J. Balle', and G. Toderici. "Joint autoregressive and hierarchical priors for learned image compression." $32^{nd}$ Conf. on Neural Information Processing Systems (NeurIPS 2018), Montreal, Canada, 2018.
[2] J. Balle', D. Minnen, S. Singh, S. J. Hwang, and N. Johnston. "Variational image compression with a scale hyperprior." In International Conference on Learning Representations (ICLR), 2018, also arXiv:1802.01436v2 (2018).
[3] Z. Cheng, H. Sun, M. Takeuchi, and J. Katto. "Learned image compression with discretized Gaussian mixture likelihoods and attention modules." In Proceedings of the IEEE/CVF Conference on Computer Vision and Pattern Recognition (CVPR)", pages 7939-7948, 2020, also arXiv e-prints (2020): arXiv-2001.01568v3, 30 Mar. 2020.
[4] G. Lu, W. Ouyang, D. Xu, X. Zhang, C. Cai, and Z. Gao, "DVC: An end-to-end deep video compression framework," in 2019 IEEE/CVF Conference on Computer Vision and Pattern Recognition (CVPR) (pp. 10998-11007) IEEE Computer Society, 2019, also arXiv: 1812.00101v3, 7 Apr. 2019.
[5] J. Duda, "Asymmetric numeral systems: entropy coding combining speed of Huffman coding with compression rate of arithmetic coding," arXiv preprint arXiv.1311.2540v2, 6 Jan. 2014.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to entropy modeling of latent features in image and video coding, such as those described herein. The computer and/or IC may compute any of a variety of parameters or values that relate to entropy modeling of latent features in image and video coding described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder, or the like may implement methods related to entropy modeling of latent features in image and video coding as described above by executing software instructions in a program memory accessible to the processors. Embodiments of the invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to entropy modeling of latent features in image and video coding are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method to decode with a processor an image or a coded video sequence with a neural network, the method comprising:
receiving a coded image or a coded video sequence comprising coded pictures and syntax parameters for an entropy model for latent features of the image or coded video sequence, wherein the entropy model comprises one or more probability density functions (PDFs);
parsing the syntax parameters for the entropy model for the latent features to generate model parameters for the entropy model, wherein the syntax parameters comprise: the number of one or more PDFs being used, an identifier of each PDF being used among a list of available PDFs; and
decoding, using the neural network, the coded image or the coded video sequence using the generated model parameters for the entropy model.

EEE 2. The method of EEE 1, wherein the syntax parameters further comprise the number of PDF parameters in each PDF.

EEE 3. The method of EEE 1 or EEE 2, wherein the syntax parameters further comprise syntax elements indicating which PDF parameters across two or more PDFs being used are being shared.

EEE 4. The method of any preceding EEE, wherein the number of PDFs being used is larger than one.

EEE 5. The method of EEE 4, wherein the one or more PDFs comprise at least one Gaussian PDF with a first mean value and a first variance value and at least one Laplace PDF with a second mean value and a second variance value.

EEE 6. The method of EEEs 3 and 5, wherein the syntax elements indicating which PDF parameters between the Gaussian PDF and the Laplace PDF are being shared indicate that their mean values are the same.

EEE 7. The method of EEEs 3 and 5, wherein the syntax elements indicating which PDF parameters between the Gaussian PDF and the Laplace PDFs are being shared indicate that their variance values are the same.

EEE 8. The method of EEEs 3 and 5, wherein the syntax elements indicating which PDF parameters between the Gaussian PDF and the Laplace PDFs are being shared indicate that indicate that their mean values are the same and that their variance values are the same.

EEE 9. The method of any preceding EEE, wherein the list of available PDFs comprise a Gaussian PDF, a Laplace PDF, and a uniform PDF.

EEE 10. The method of any preceding EEE as far as dependent on EEE 3, wherein the syntax elements indicating which PDF parameters across two or more PDFs used are being shared comprise a set of shared model parameters flags, denoted as shared_model_params[i][j], and a set of shared model indices, denoted as shared_model_idx[i] [j], wherein shared_model_params[i][j]=1 specifies that the j-th PDF parameter of the i-th PDF is equal to the j-th PDF parameter of the PDF indicated by shared_model_idx[i][j], wherein the shared_model_idx[i][j]=k indicates that the j-th PDF parameter of the i-th PDF is equal to the j-th PDF parameter of the k-th PDF.

EEE 11. The method of any preceding EEE, wherein the syntax parameters for the entropy model comprise high-level syntax at the sequence, picture, or slice level.

EEE 12. The method of any preceding EEE, wherein for an entropy model for the latent features comprising two or more PDFs, the entropy model further comprises weights to compute a weighted average among the one or more PDFs.

EEE 13. The method of any preceding EEE, wherein in a coded video sequence the entropy model may alternate or switch between:
a first PDF,
a second PDF, and
a weighted average of the first PDF and the second PDF.

EEE 14. A method to encode with a processor an image or a coded video sequence with a neural network, the method comprising:
receiving an image or a video sequence comprising pictures;
analyzing, using the neural network, the image or the video sequence to determine an entropy model for latent features in the image or video sequence, wherein the entropy model comprises one or more probability density functions (PDFs);
generating syntax parameters for the determined entropy model, wherein the syntax parameters comprise: the number of one or more PDFs being used; an identifier of each PDF being used among a list of available PDFs;
encoding the image or the video sequence into a coded bitstream using the determined entropy model for the latent features; and including the syntax parameters for the entropy model in the coded bitstream.

EEE 15. The method of EEE 14, wherein the syntax parameters further comprise the number of PDF parameters in each PDF.

EEE 16. The method of EEE 14 or EEE 15, wherein the syntax parameters further comprise syntax elements indicating which PDF parameters across two or more PDFs being used are being shared.

EEE 17. The method of any one of EEEs 14-16, wherein the number of PDFs being used is larger than one.

EEE 18. The method of EEE 17, wherein the one or more PDFs comprise at least one Gaussian PDF with a first mean value and a first variance value and at least one Laplace PDF with a second mean value and a second variance value.

EEE 19. The method of EEEs 16 and 18, wherein the syntax elements indicating which PDF parameters between the Gaussian PDF and the Laplace PDF are being shared indicate that their mean values are the same.

EEE 20. The method of EEEs 16 and 18, wherein the syntax elements indicating which PDF parameters between the Gaussian PDF and the Laplace PDFs are being shared indicate that their variance values are the same.

EEE 21. The method of EEEs 16 and 18, wherein the syntax elements indicating which PDF parameters between the Gaussian PDF and the Laplace PDFs are being shared indicate that indicate that their mean values are the same and that their variance values are the same.

EEE 22. The method of any one of EEEs 14-21, wherein the list of available PDFs comprise a Gaussian PDF, a Laplace PDF, and a uniform PDF.

EEE 23. The method of any one of EEEs 14-22 as far as dependent on EEE 16, wherein the syntax elements indicating which PDF parameters across two or more PDFs used are being shared comprise a set of shared model parameters flags, denoted as shared_model_params[i][j], and a set of shared model indices, denoted as shared_model_idx[i][j], wherein shared_model_params[i] [j]=1 specifies that the j-th PDF parameter of the i-th PDF is equal to the j-th PDF parameter of the PDF indicated by shared_model_idx[i][j], wherein the shared_model_idx[i][j]=k indicates that the j-th PDF parameter of the i-th PDF is equal to the j-th PDF parameter of the k-th PDF.

EEE 24. The method of any one of EEEs 14-23, wherein the syntax parameters for the entropy model comprise high-level syntax at the sequence, picture, or slice level.

EEE 25. The method of any one of EEEs 14-24, wherein for an entropy model for the latent features comprising two or more PDFs, the entropy model further comprises weights to compute a weighted average among the one or more PDFs.

EEE 26. The method of any one of EEEs 14-25, wherein in a coded video sequence the entropy model may alternate or switch between:
a first PDF,
a second PDF, and
a weighted average of the first PDF and the second PDF.

EEE 27. The method of EEE 14, wherein when the entropy model comprises a mix of two or more PDFs, further identifying shared and non-shared PDF parameters among the two or more PDFs in the entropy model, and further generating syntax parameters identifying which PDF parameters across two or more PDFs being used are being shared.

EEE 28. A non-transitory computer-readable storage medium having stored thereon computer-executable instructions for executing with one or more processors a method in accordance with any one of the EEEs 1-27.

EEE 29. An apparatus comprising a processor and configured to perform any one of the methods recited in EEEs 1-27.

The invention claimed is:

1. A method to decode with a processor a coded image or a coded video sequence with a neural network, the method comprising:

receiving a coded image or a coded video sequence comprising coded pictures and syntax parameters for an entropy model for latent features of the coded image or coded video sequence, wherein the entropy model comprises one or more probability density functions (PDFs) selected from a list of available PDFs that includes different distribution types, wherein the list of available PDFs comprise a Gaussian PDF, a Laplace PDF, and a uniform PDF;

parsing the syntax parameters for the entropy model for the latent features to generate model parameters for the entropy model, wherein the syntax parameters comprise: the number of one or more PDFs being used, an identifier of each PDF being used among the list of available PDFs; and decoding, using the neural network, the coded image or the coded video sequence using the generated model parameters for the entropy model.

2. A method to encode with a processor an image or a video sequence with a neural network, the method comprising:

receiving an image or a video sequence comprising pictures;

analyzing, using the neural network, the image or the video sequence to determine an entropy model for latent features in the image or video sequence, wherein the entropy model comprises one or more probability density functions (PDFs) selected from a list of available PDFs that includes different distribution types, wherein the list of available PDFs comprise a Gaussian PDF, a Laplace PDF, and a uniform PDF;

generating syntax parameters for the determined entropy model, wherein the syntax parameters comprise: the number of one or more PDFs being used, an identifier of each PDF being used among the list of available PDFs;

encoding the image or the video sequence into a coded bitstream using the determined entropy model for the latent features; and including the syntax parameters for the entropy model in the coded bitstream.

3. The method of claim 1, wherein the number of PDFs being used is larger than one.

4. The method of claim 3, wherein the syntax parameters further comprise the number of PDF parameters in each PDF, and syntax elements indicating which PDF parameters across two or more PDFs being used are being shared.

5. The method of claim 3, wherein the one or more PDFs comprise at least one Gaussian PDF with a first mean value and a first variance value and at least one Laplace PDF with a second mean value and a second variance value.

6. The method of claim 4, wherein the syntax elements indicating which PDF parameters between the Gaussian PDF and the Laplace PDF are being shared indicate that their mean values are the same.

7. The method of claim 4, wherein the syntax elements indicating which PDF parameters between the Gaussian PDF and the Laplace PDFs are being shared indicate that their variance values are the same.

8. The method of claim 4, wherein the syntax elements indicating which PDF parameters across two or more PDFs used are being shared comprise a set of shared model parameters flags, denoted as shared_model_params [i] [j], and a set of shared model indices, denoted as shared_model_idx [i] [j], wherein shared_model_params [i] [j]=1 specifies that the j-th PDF parameter of the i-th PDF is equal to the j-th PDF parameter of the PDF indicated by shared_model_idx [i] [j], wherein the shared_model_idx [i] [j]=k indicates that the j-th PDF parameter of the i-th PDF is equal to the j-th PDF parameter of the k-th PDF.

9. The method of claim 1, wherein the syntax parameters for the entropy model comprise high-level syntax at the sequence, picture, or slice level.

10. The method of claim 1, wherein for an entropy model for the latent features comprising two or more PDFs, the entropy model further comprises weights to compute a weighted average among the one or more PDFs.

11. The method of claim 1, wherein in a coded video sequence the entropy model may alternate between:

a first PDF, a second PDF, and a weighted average of the first PDF and the second PDF.

12. The method of claim 2, wherein when the entropy model comprises a mix of two or more PDFs, further identifying shared and non-shared PDF parameters among the two or more PDFs in the entropy model, and further generating syntax parameters identifying which PDF parameters across two or more PDFs being used are being shared.

13. A non-transitory computer-readable storage medium having stored thereon computer-executable instructions for executing with one or more processors a method in accordance with claim 1.

14. An apparatus comprising a processor and configured to perform the method as recited in claim 1.

* * * * *